United States Patent
Leydier et al.

(10) Patent No.: US 6,694,399 B1
(45) Date of Patent: Feb. 17, 2004

(54) METHOD AND DEVICE FOR UNIVERSAL SERIAL BUS SMART CARD TRAFFIC SIGNALING

(75) Inventors: Robert Antoine Leydier, La Londe les Maures (FR); Taylor Jude Leaming, III, Austin, TX (US)

(73) Assignees: Schlumberger Malco, Inc., Owings Mills, MD (US); STMicroelectronics, Inc., Carrollton, TX (US)

( * ) Notice: Subject to any disclaimer, the term of this patent is extended or adjusted under 35 U.S.C. 154(b) by 420 days.

(21) Appl. No.: 09/661,748

(22) Filed: Sep. 14, 2000

(51) Int. Cl.[7] .......................... G06K 19/06; G06F 13/00
(52) U.S. Cl. ........................................ 710/301; 235/492
(58) Field of Search ................................. 710/301, 302, 710/305, 306, 313; 235/375, 380, 492; 711/115

(56) References Cited

U.S. PATENT DOCUMENTS

| | | | |
|---|---|---|---|
| 6,119,194 A | | 9/2000 | Miranda et al. |
| 6,151,647 A | * | 11/2000 | Sarat .......................... 710/301 |
| 6,168,077 B1 | * | 1/2001 | Gray et al. .................. 235/380 |
| 6,199,128 B1 | * | 3/2001 | Sarat .......................... 710/301 |
| 6,343,364 B1 | * | 1/2002 | Leydier et al. ............. 713/500 |
| 6,439,464 B1 | * | 8/2002 | Fruhauf et al. ............. 235/492 |
| 6,581,122 B1 | * | 6/2003 | Sarat .......................... 710/301 |

FOREIGN PATENT DOCUMENTS

| | | |
|---|---|---|
| EP | 1 001 329 A | 5/2000 |
| FR | 2 783 336 A | 3/2000 |
| WO | WO 00 42491 A | 7/2000 |

OTHER PUBLICATIONS

Patent Abstracts of Japan, vol. 1999, No. 08, Jun. 30, 1999; and JP 11 088381 A (NEC Corp), Mar. 30, 1999, abstract.

* cited by examiner

*Primary Examiner*—Glenn A Auve
(74) *Attorney, Agent, or Firm*—Taylor Russell & Russell, P.C.

(57) ABSTRACT

A method and device are disclosed for detecting successful transfers between a Universal Serial Bus (USB) port and a USB smart card and generating a signal that provides an indication of the USB transaction activity. This USB transaction activity signal is modulated according to the USB transaction activity and drives a Light Emitting Diode (LED) in a preferred embodiment of the invention. A counter internal to the USB smart card scales the transaction activity signal such that it is perceptible to the user. Because the current through the LED depends upon the USB transaction activity, the brightness of the LED varies according to the USB transaction activity. The LED may be driven from a current mirror sink or source, or a current switch sink or source.

43 Claims, 11 Drawing Sheets

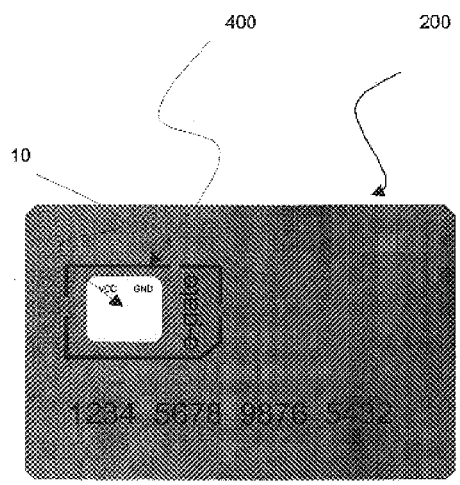
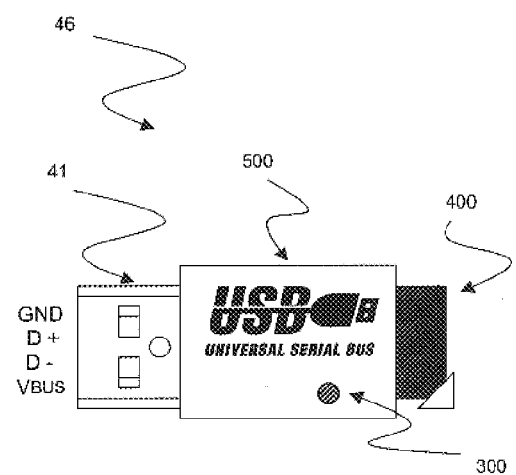
FIG. 6
FIG. 7

METHOD AND DEVICE FOR UNIVERSAL SERIAL BUS SMART CARD TRAFFIC SIGNALING

BACKGROUND

The invention relates generally to Integrated Circuit (IC) cards or smart cards used in processing transactions involving goods and services. Smart cards are plastic cards having microprocessor and memory circuits attached to the front or back side that connect to electrical contacts located on a front side of the card. The circuits are activated and data accessed from the card by inserting the card into a reader device that makes connections to the electrical contacts. More particularly, the invention relates to a device and method for connecting a smart card having a Universal Serial Bus (USB) interface to smart card reader devices that require no active electronic circuitry. Furthermore, the invention relates to a novel method and device for providing visual indication of data flow activity from the smart card.

Smart cards are a class of data cards. Data cards used in processing transactions are either passive or active in nature. Passive data cards include traditional credit, debit and ATM cards that make use of stored data on a magnetic strip on the back of the card. When a transaction is processed using a passive data card, transaction verification is generally required via a reader device connected to a remote computer over a telephone network. During a transaction, data may be written and read from the magnetic strip. Active data cards or smart cards make use of processor and memory circuits embedded on the card that are activated when the card is connected to a reader device. Since smart cards may contain the intelligence required to complete a transaction, the transaction may be completed locally without resorting to a telephone connection to a remote transaction verification facility. In addition to storing data related to the owner's account such as identification number and account balance, the circuits also contain encryption for security purposes. Smart cards are used in many applications, including Subscriber Identification Module (SIM) in Global System for Mobile (GSM) telephones, TV satellite receivers, banking, health care programs, parking and highway toll payment, etc. Smart cards are expected to find increasingly wider application, eventually replacing magnetic strip type data cards.

The basic smart card standard is the International Standard ISO 7816, which provides detailed requirements for the physical, electrical, mechanical, and application programming interface for IC cards with contacts. In particular, International Standard ISO 7816-1 Physical Characteristics, International Standard 7816-2 Dimension and Location of the Contacts, International Standard ISO 7816-3 Electronic Signals and Transmission Protocols, and International Standard ISO 7816-10 Electronic Signals and Answer to Reset for Synchronous Cards are incorporated herein by reference. This standard provides for a serial interface connection to the smart card. In a great majority of cases, these cards are used in a reader connected to a computer. The reader for smart cards that comply with the ISO standard contains electronic circuits that enable communication between the card and the computer. The smart card is inserted into a card reader connector that allows a card reader first interface to communicate with the smart card. A second card reader interface is connected to a computer by means of a serial port link, a parallel port link, or a Universal Serial Bus (USB). The smart card reader based on the ISO standard makes use of a micro-controller with its associated software. Electronic components perform the task of translating signals between the smart card and the computer. Some of these components are dedicated to the visualization of the data flow between the application running on the computer and the smart card.

The ISO 7816-3 class B operating conditions make use of the RESET (RST), clock (CLK) and input/output (I/O) communication signals. A smart card reader generates signals RST, CLK and merely buffers the half-duplex communication link on I/O. The signals VCC, GND, RST, CLK and I/O are connected to smart card module contacts. The ISO 7816 smart card reader provides for communication between the computer-based customer application and the smart card by means of an electronic interface circuitry. This interface drives a device that provides a visual indication of I/O activity in the link. Generally, a Light-Emitting Diode (LED) is used for visual indication.

The Universal Serial Bus (USB) has recently become firmly established and has gained wide acceptance in the Personal Computer (PC) marketplace. The USB was developed in response to a need for a standard interface that extends the concept of "plug and play" to devices external to a PC, and enables users to install and remove external peripheral devices without having to open the PC case or to remove power from the PC. The USB provides a low-cost, half-duplex serial interface that is easy to use and readily expandable. The USB also supplies up to 500 mA of current at 5 volts to interconnected devices. The USB is currently defined by the Universal Serial Bus Specification written and controlled by USB Implementers Forum, Inc., a non-profit corporation founded by the group of companies that developed the USB Specification. In particular, Chapter 5 USB Data Flow Model, Chapter 7 Electrical, and Chapter 8 Protocol Layer of Universal Serial Bus Specification are incorporated herein by reference. The increasingly widespread use of the USB in computers has led smart card reader manufacturers to develop USB interfaces for connection of their products to computers to complement the existing serial and parallel interfaces. However, because of the differences between the serial interface defined by ISO 7816 and the serial interface defined by the USB specification, smart cards have not been directly compatible with the USB specification. And different card reader configurations have been required due to incompatibility constraints between the various computer interface standards.

The widespread use of the USB in computers has led smart card and smart card reader manufacturers to further develop their products and further reduce costs. A USB smart card reader establishes a communication link between a computer-based application and a smart card or plug module. The USB smart card reader or the USB token reader provide contacts for the interconnections between the USB signals and the four corresponding contact zones of a smart card module fitted out with an IC. The USB smart card reader connects smart card module contacts C1 and C5 as well as pins C4 and C8 respectively to the USB signals $V_{BUS}$, GND, D+ and D−. There is no electronic circuitry that enables the activity of the link to be reported. The smart card reader complexity has been transferred into the computer, reducing the overall costs. The USB smart card needs a pass-through connector and a driver to communicate with the computer. This architecture reduces the number of electronic components and consequently the cost without compromising the data transfer speed and the transfer reliability. There is only one IC on a USB smart card to perform communications, computing and storage.

For the foregoing reasons, there is a need to provide a smart card with a USB interface that enables a smart card to connect to an USB port without the need for any interposing electronic circuitry, enabling application software in a computer to communicate through a specific smart card software driver directly with the USB interface on the smart card. There is a further need to provide a visual indication of successful data transfers between a computer and an IC module positioned on a smart card.

SUMMARY

The present invention is directed towards a method and device for providing a smart card with the capability of supporting the serial interface defined by the USB specification. It relates to a physical link between a USB port and a smart card. Furthermore, the present invention is also directed towards a method and device for connecting a smart card to a USB port with a simple connector without the need for any interposing electronic circuitry. The invention further relates to a device and method to visualize data flow to and from a smart card.

A communication pipe is established between the client software in a computer and USB smart card endpoints. A USB smart card serial engine captures the downstream traffic and delivers it to a smart card micro-controller. The USB smart card serial engine broadcasts the upstream traffic from the smart card micro-controller to the computer. The upstream and the downstream traffic are composed of packets. Every time a packet transfer occurs without error, the USB smart card serial engine hardware generates a Correct TRansfer (CTR) flag that results in an interrupt. The USB smart card software clears this flag once the interrupt has been serviced. The CTR signal drives a first stage of a ten-bit counter. One output is selected for driving an I/O buffer connected to an I/O connector pin. This pin is connected to an LED on a smart card reader that blinks at a pace set by the USB traffic. All functions are included in a single IC, and the only electronic components required in the smart card reader are a LED to provide visual indication of data flow activity, the passthrough connector and in some embodiment a resistor limiting the current in the LED. The present invention provides a method and device that allows USB traffic between a host computer and a USB smart card to be visualized.

A method having features of the present invention comprises transmitting and receiving USB packets comprising differential serial signals between the smart card module and the USB port, generating a correct transfer signal by the smart card module upon successful transmission and reception of a USB packet and signaling transaction activity based on the correct transfer signal. The signaling step may include connecting the correct transfer signal to an input of a counter, both positioned within the smart card module, and signaling transaction activity based on an output of the counter. The method may further include selecting an output of the counter so that the user is provided with a perceptible indication of signaling transaction activity. It may also include connecting the output of the counter to an output buffer positioned within the smart card module that drives a LED. The output buffer may comprise a current source circuit connected to a GND reference voltage. The output buffer may comprise a current source circuit connected to a $V_{BUS}$ supply voltage. The output buffer may comprise a switch circuit connected to a $V_{BUS}$ supply voltage. The output buffer may comprise a switch circuit connected to a GND reference voltage.

Another embodiment of the present invention may comprise transmitting and receiving USB packets comprising differential serial signals between the USB port and external terminals of transceivers positioned within the smart card module, connecting internal terminals of the transceivers to inputs of a serial engine positioned within the smart card module, interconnecting a correct transfer signal from an output of the serial engine to a micro-controller and a counter, both positioned within the smart card module, controlling the counter from the micro-controller, driving an input of an output buffer positioned within the smart card module from an output of the counter, and activating a device from an output of the output buffer for signaling transaction activity based on the correct transfer signal. The device being activated may be a LED, having an anode and a cathode.

The method may further include connecting the anode of the LED to a $V_{BUS}$ supply voltage of the smart card module, connecting the cathode of the LED to an I/O contact of the smart card module, connecting a second NMOS transistor of a current mirror circuit within the smart card module between the I/O contact and a GND reference voltage contact for providing a modulated current sink for illumination of the LED, connecting a first NMOS transistor of the current mirror circuit within the smart card module to the second NMOS transistor, and providing a modulated current to the first NMOS transistor from the output of the output buffer that reflects the USB transaction activity, causing the illumination intensity of the LED to be modulated according to the USB transaction activity. The cathode of the LED may be connected to a contact of the smart card module selected from the group consisting of C2, C3, C6 and C7.

The method may further include connecting the anode of the LED to an I/O contact of the smart card module, connecting the cathode of the LED to a GND reference voltage of the smart card module, connecting a second PMOS transistor of a current mirror circuit within the smart card module between the I/O contact and a $V_{BUS}$ Supply voltage contact for providing a modulated current sink for illumination of the LED, connecting a first PMOS transistor of the current mirror circuit within the smart card module to the second PMOS transistor, and providing a modulated current to the first PMOS transistor from the output of the output buffer that reflects the USB transaction activity, causing the illumination intensity of the LED to be modulated according to the USB transaction activity. The method may include the anode of the LED being connected to a contact of the smart card module selected from the group consisting of C2, C3, C6 and C7.

The method may further include connecting the cathode of the LED to a GND reference voltage of the smart card module, connecting a first terminal of a resistor to the anode of the LED, connecting a second terminal of the resistor to an I/O contact of the smart card module, connecting a PMOS transistor switch of a current switch circuit within the smart card module between the I/O contact and a $V_{BUS}$ supply voltage contact, and providing a modulated voltage source from the output of the output buffer that reflects the USB transaction activity to a gate terminal of the PMOS transistor switch within the smart card module, causing the illumination intensity of the LED to be modulated according to the USB transaction activity. The second terminal of the resistor may be connected to a contact of the smart card module selected from the group consisting of C2, C3, C6 and C7.

The method may further comprise connecting the anode of the LED to a $V_{BUS}$ supply voltage of the smart card module, connecting a first terminal of a resistor to the cathode of the LED, connecting a second terminal of the resistor to an I/O contact of the smart card module, connecting an NMOS transistor switch of a current switch circuit within the smart card module between the I/O contact and a GND reference voltage contact, and providing a modulated voltage source from the output of the output buffer that reflects the USB transaction activity to a gate terminal of the NMOS transistor switch within the smart card module, causing the illumination intensity of the LED to be modulated according to the USB transaction activity. The second terminal of the resistor may be connected to a contact of the smart card module selected from the group consisting of C2, C3, C6 and C7.

A further embodiment of the present invention is a device comprising transceivers positioned within the smart card module for transmitting and receiving USB packets comprising differential serial signals between the USB port and external terminals of transceivers, the transceivers having internal terminals connected to inputs of a serial engine positioned within the smart card module, a correct transfer signal from an output of the serial engine interconnected to a micro-controller and a counter, both positioned within the smart card module, the counter being controlled from the micro-controller, an output of the counter driving an input of an output buffer positioned within the smart card module, and a device activated from an output of the output buffer for signaling transaction activity based on the correct transfer signal. The device being activated may be a LED, having an anode and a cathode.

The device may further include the anode of the LED connected to a $V_{BUS}$ supply voltage of the smart card module, the cathode of the LED connected to an I/O contact of the smart card module, a second NMOS transistor of a current mirror circuit within the smart card module connected between the I/O contact and a GND reference voltage contact for providing a modulated current sink for illumination of the LED, a first NMOS transistor of the current mirror circuit within the smart card module connected to the second NMOS transistor, and a modulated current provided to the first NMOS transistor from the output of the output buffer that reflects the USB transaction activity, causing the illumination intensity of the LED to be modulated according to the USB transaction activity. The cathode of the LED may be connected to a contact of the smart card module selected from the group consisting of C2, C3, C6 and C7.

The device may further comprise the anode of the LED connected to an I/O contact of the smart card module, the cathode of the LED connected to a GND reference voltage of the smart card module, a second PMOS transistor of a current mirror circuit within the smart card module connected between the I/O contact and a $V_{BUS}$ supply voltage contact for providing a modulated current sink for illumination of the LED, a first PMOS transistor of the current mirror circuit within the smart card module connected to the second PMOS transistor, and a modulated current provided to the first PMOS transistor from the output of the output buffer that reflects the USB transaction activity, causing the illumination intensity of the LED to be modulated according to the USB transaction activity. The anode of the LED is connected to a contact of the smart card module selected from the group consisting of C2, C3, C6 and C7.

The device may further comprise the cathode of the LED connected to a GND reference voltage of the smart card module, a first terminal of a resistor connected to the anode of the LED, a second terminal of the resistor connected to an I/O contact of the smart card module, a PMOS transistor switch of a current switch circuit within the smart card module connected between the I/O contact and a $V_{BUS}$ supply voltage contact, and a modulated voltage source provided from the output of the output buffer that reflects the USB transaction activity to a gate terminal of the PMOS transistor switch within the smart card module, causing the illumination intensity of the LED to be modulated according to the USB transaction activity. The second terminal of the resistor is connected to a contact of the smart card module selected from the group consisting of C2, C3, C6 and C7.

The device may further include the anode of the LED connected to a $V_{BUS}$ supply voltage of the smart card module, a first terminal of a resistor connected to the cathode of the LED, a second terminal of the resistor connected to an I/O contact of the smart card module, an NMOS transistor switch of a current switch circuit within the smart card module connected between the I/O contact and a GND reference voltage contact, and a modulated voltage source provided from the output of the output buffer that reflects the USB transaction activity to a gate terminal of the NMOS transistor switch within the smart card module, causing the illumination intensity of the LED to be modulated according to the USB transaction activity. The second terminal of the resistor may be connected to a contact of the smart card module selected from the group consisting of C2, C3, C6 and C7.

BRIEF DESCRIPTION OF THE DRAWINGS

These and other features, aspects, and advantages of the present invention will become understood with regard to the following description, appended claims, and accompanying drawings where:

FIG. 6 shows a USB smart card module plug ready to be separated from a USB smart card;

FIG. 7 shows a USB style token reader with a USB smart card module plug inserted;

DETAILED DESCRIPTION

Figure 1:
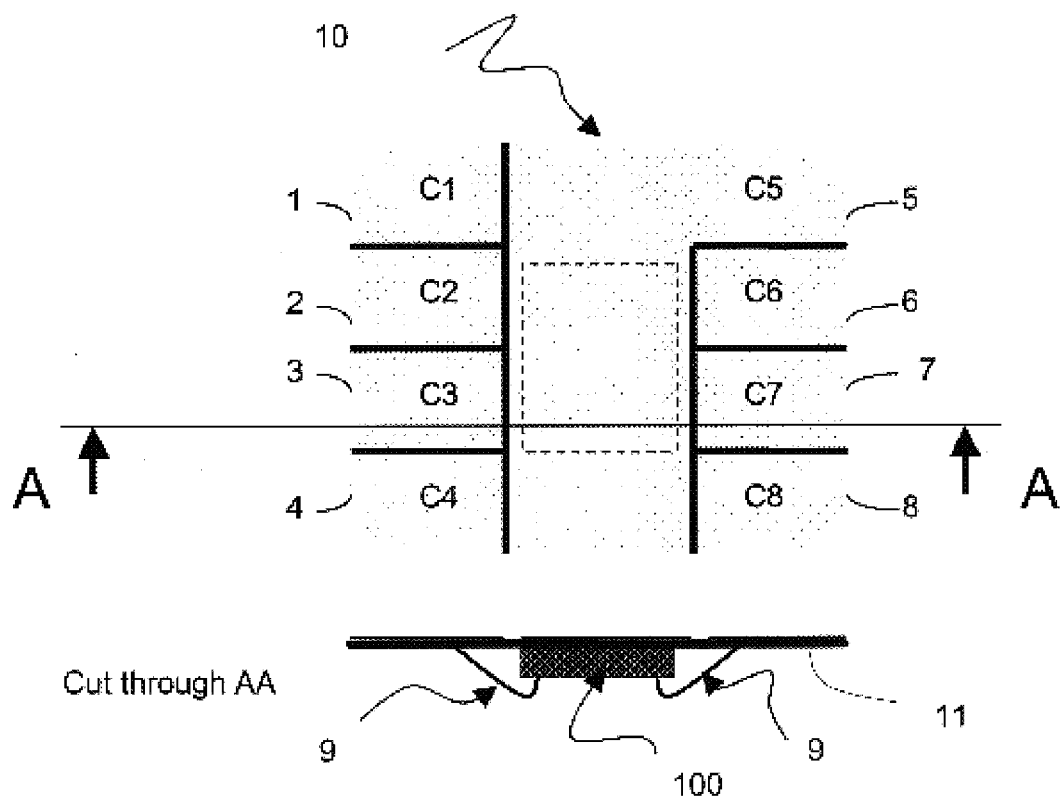
FIG. 1 shows a smart card module that is compatible with a USB smart card for connecting to a USB serial link.

Turning to FIG. 1, FIG. 1 shows a smart card module 10 that is compatible with ISO7816-2 Dimension and Location of the Contacts. The smart card module 10 has eight electrical contacts 1–8 positioned on a substrate 11 and an IC 100 attached to the side of the substrate 11 opposite the contacts 1–8. The electrical contacts 1–8 are electrically isolated from each other. Electrical connections between the IC 100 and the contacts 1–8 are accomplished through the use of bonding wires 9. Electrical connections between the opposite sides of the substrate 11 may be accomplished by any means common in the art, including conductive vias. The IC 100 and the bonding wires 9 are normally encapsulated for protection from mechanical and environmental effects. The smart card module 10 is compatible for use in asynchronous ISO 7816 applications. Contact C1 1 is assigned to the Supply voltage VCC, contact C2 2 is assigned to the Reset signal RST, contact C3 3 is assigned to the Clock signal CLK, contact C5 5 is assigned to the GND reference voltage, contact C6 6 is assigned to the Variable supply voltage VPP 6 and contact C7 7 is assigned to Data input/output I/O. In synchronous ISO7816-10 applications contact C4 4 is assigned to function code FCB and contact C8 8 may also be used for other synchronous applications. The smart card module 10 is compatible for use in USB applications. In a USB smart card application. Contact C1 1 is assigned to the Supply voltage $V_{BUS}$, contact C4 4 is assigned to the Data line D+, contact C5 5 is assigned to the GND reference voltage, contact C8 8 is assigned to the Data line D−. Contacts C2 2, C3 3, C6 6 and C7 7 are available for other uses. The present invention consists of the use of one contact of C2, C3, C6 and C7 module contacts to report the USB activities between the computer-based application and the USB smart card IC 100.

Figure 2:
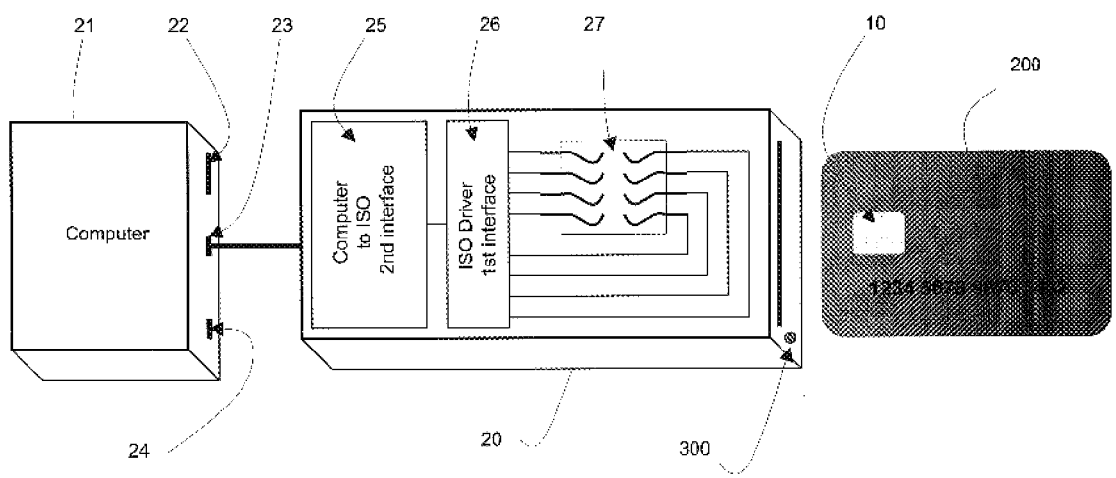
FIG. 2 shows a block diagram of a ISO standard smart card reader and a smart card.

Turning to FIG. 2, FIG. 2 shows a block diagram of an ISO standard smart card reader 20. The smart card reader 20 is connected to a computer 21. A smart card 200 is inserted in the smart card reader 20. The protocol used between the smart card 200 and the smart card reader 20 is described by the ISO7816 standard. This protocol is not embedded in the computer 21. When the smart card 200 is inserted in the smart card reader 20, a smart card module 10 is connected to a smart card first interface 26 using a pass-through connector 27. The first interface 26 masters the half-duplex ISO7816 protocol. The smart card reader 20 is connected to the computer parallel port 22, serial port 23 or even a USB port 24 through a second interface 25. An LED 300, driven by hardware circuitry in the smart card reader 20, provides an indication of any traffic between the smart card and the computer.

Figure 3:
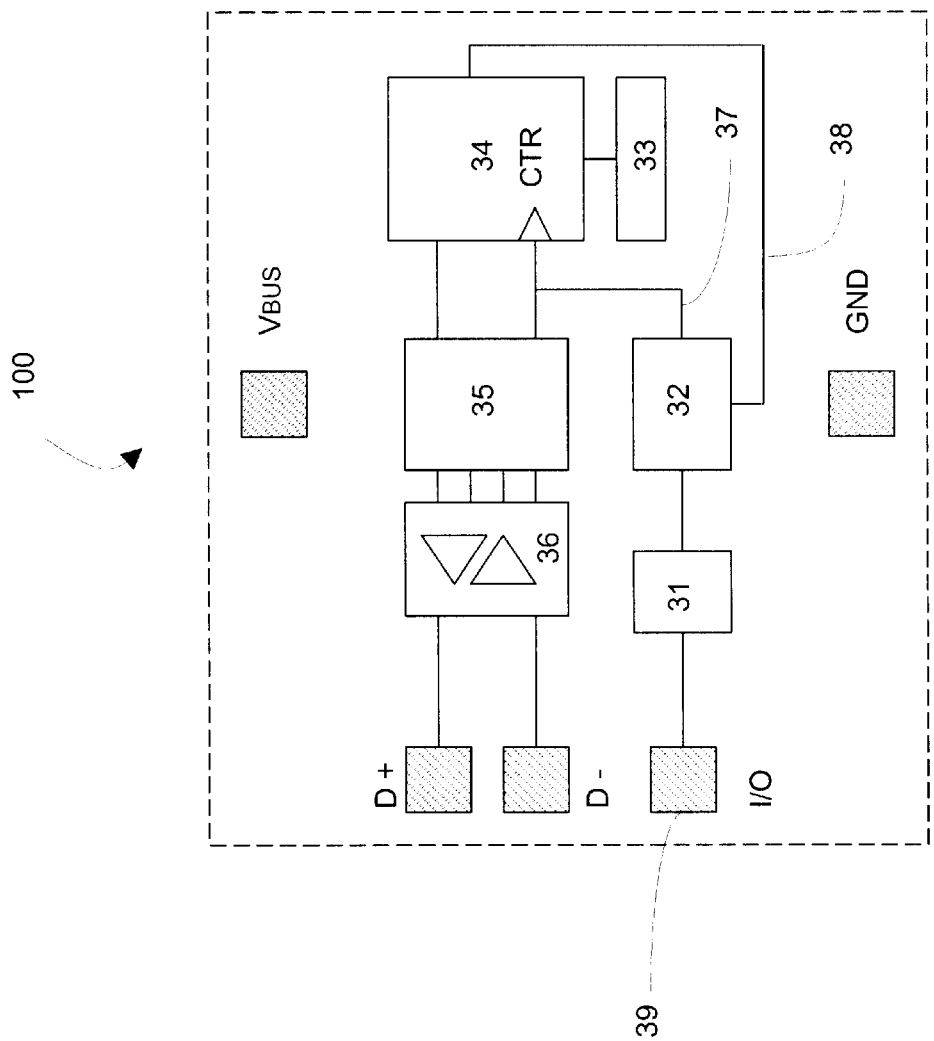
FIG. 3 shows a block diagram of a novel IC having USB transceivers and USB traffic signaling circuits.

Turning now to FIG. 3, FIG. 3 shows a block diagram of a novel IC 100 having USB transceivers 36 and USB traffic signaling circuits 31, 32. FIG. 3 depicts one particular embodiment of the present invention. The USB transceiver 36 receives differential serial signals D+ and D−, and communicates with a serial engine 35. The serial engine 35 exchanges data with a micro-controller 34. A software program is stored in a memory 33. Every time a USB packet is transferred upstream or downstream with success, a Correct Transfer (CTR) signal 37, connected between the serial engine 35, the micro-controller 34 and a counter 32, is set by the serial engine hardware 35. A successful transfer occurs when no error is detected in a packet transfer. The software program stored in the memory 33 causes the micro-controller 34 to clear the CTR signal 37 once a CTR interrupt is serviced by the micro-controller 34. The counter 32 has, for example, ten stages. The software program stored in the memory 33 causes the micro-controller 34 to select an appropriate output of the counter 32 via the select signal 38. The selected output of the counter 32 activates the LED driver 31, connected to the I/O pad 39.

Figure 4:
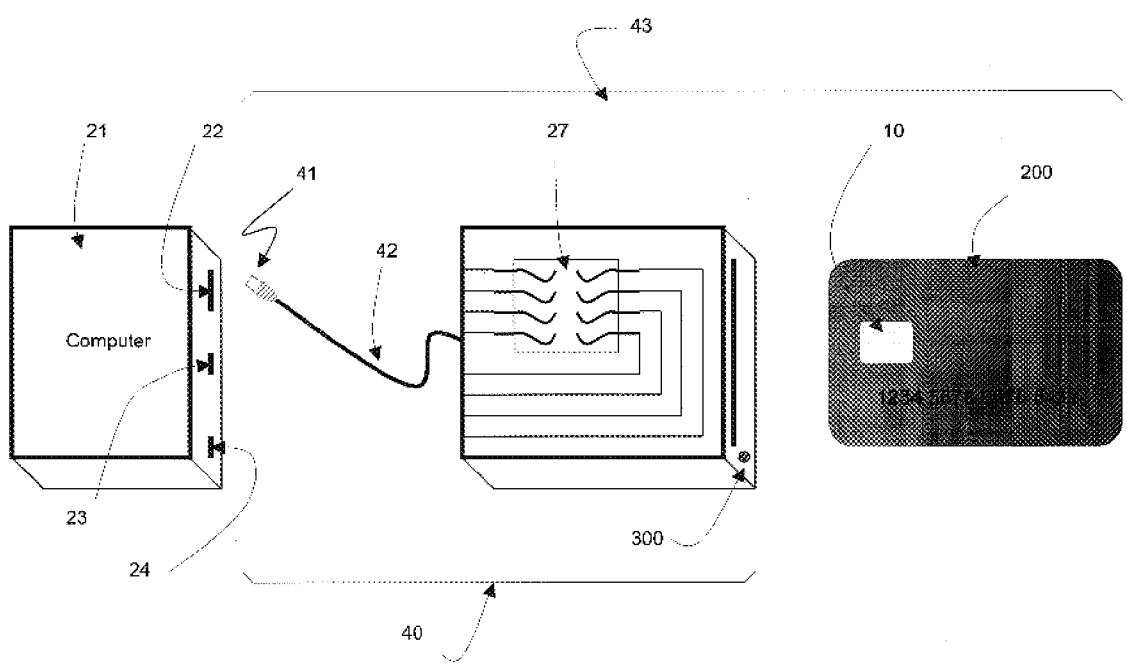
FIG. 4 shows a USB smart card reader and a smart card.

Turning now to FIG. 4, FIG. 4 shows a smart card reader 40 and a smart card 200. The smart card 200 contains a smart card module 10 as described earlier. The smart card 200 plugs into the smart card reader 40. The smart card reader 40 has connecting contacts of a pass-through connector 27 that connect the smart card module contacts to a USB cable 42 terminated by a USB series A plug 41. The USB series A plug connects to a USB Hub port 24 on a Host PC 21 or other USB hub. A LED 300 is mounted on the USB card reader in addition to the pass-through connector 27. No other active components are required in the USB smart card reader. The USB compatible smart card 200 inserted in the USB style smart card reader 40 terminated by the USB series A plug connector 41 constitute a USB smart card device 43.

Figure 5:
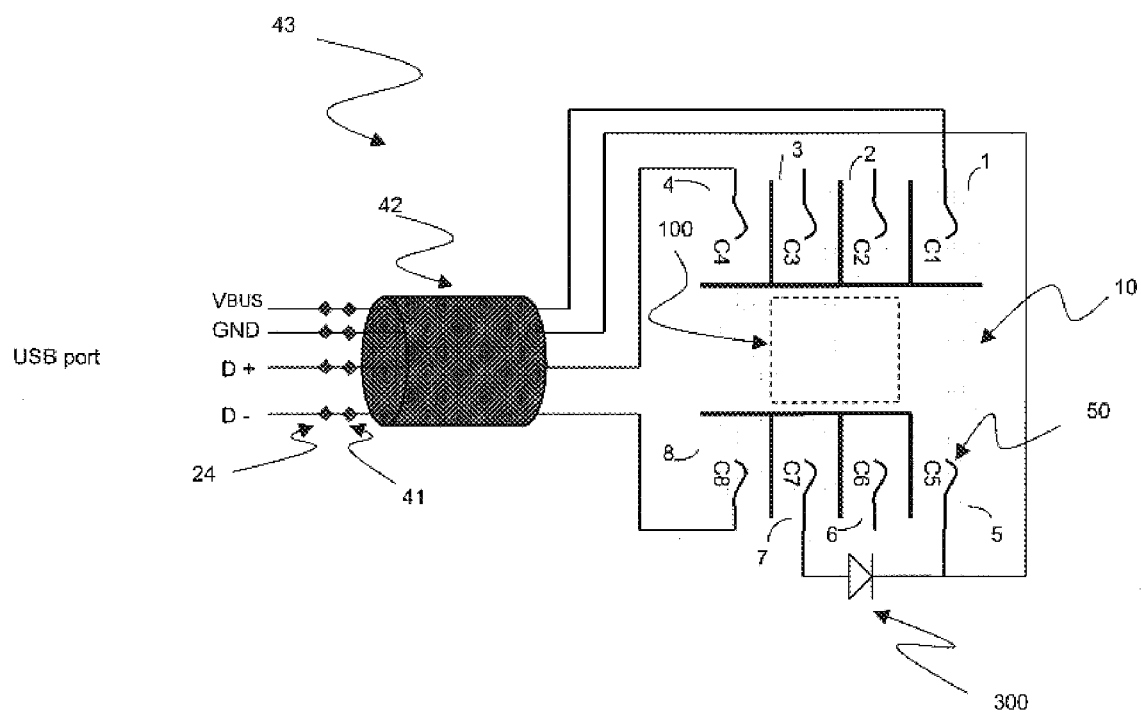
FIG. 5 shows a USB interface connection between a USB smart card module and a USB port using a cable and driving a LED to indicate USB traffic activity.

Turning now to FIG. 5, FIG. 5 shows a USB interface connection between a USB smart card module 10 and a USB port 24 using a cable 42 and driving a LED 300 to indicate USB traffic activity, as physically depicted in FIG. 4. Eight pass-through connector pins 50 within the smart card reader 40 connect to the contacts on the smart card module 10. The electrical connections from the smart card module are carried via the cable 42 to a USB Series A plug connector 41. The USB compatible smart card module 10 is inserted in the USB style smart card reader 40 equipped with the USB cable 42 terminated by the USB series A plug connector 41. The cable 42 utilizes four wires for connecting the smart card module 10 to the plug connector 41. The connector 41 may plug directly into a USB port 24 of a Host PC 21 root hub equipped with a Series A receptacle or a USB port of a hub equipped with the same receptacle as depicted in FIG. 4. The hub provides the $V_{BUS}$ power supply connected to the contact C1 1 on the smart card module 10, the GND reference voltage connected to the contact C5 5 on the smart card module 10, the Data line D+ connected to the contact C4 4 and the Data line D− connected to the contact C8 8. In the present embodiment of the invention, when a smart card is connected to a USB interface, the smart card module contacts C2, C3, and C6 are not assigned. The anode of a LED 300 is connected to the contact C7 7 of the smart card module 10 and the cathode of the LED 300 is connected to the GND reference voltage of the smart card module 10. A USB style card reader will normally provide these signals to the smart card module according to the electrical and transmission protocols defined in the USB specification. While the present embodiment of the invention makes use of contact C4 4 and contact C8 8, the ISO 7816-2standard reserves these two contacts for future use. The ISO 7816-10 assigns C4 to Function code FCB in synchronous application.

Turning now to FIG. 6, FIG. 6 shows a USB smart card module plug 400 ready to be separated from a USB smart card 200. A smart card module 10 is positioned on the smart card module plug 400. This is another form factor of a USB smart card 200. When the smart card module plug 400 is separated from the smart card 200, it may be inserted into a USB token reader 500 as shown in FIG. 7.

Turning to FIG. 7, FIG. 7 shows a token reader 500 with a plug module 400 inserted. This type of module plug 400 is widely used in SIM applications designed for GSM telephones. The connector 41 may plug directly into a USB port 24 of a Host PC 21 root hub equipped with a Series A receptacle or a USB port of a hub equipped with the same receptacle, as depicted in FIG. 4. The electrical configuration of the smart card module 10 positioned on the smart card module plug 400 in the token reader 500 is the same as that depicted in FIG. 5, except that the plug connector 41 is attached to the token reader 500 rather than the cable 42. The USB compatible smart card module plug 400 inserted in the USB style smart card reader 500 terminated by the USB series A plug connector 41 constitute a USB smart card device 46.

Figure 8:
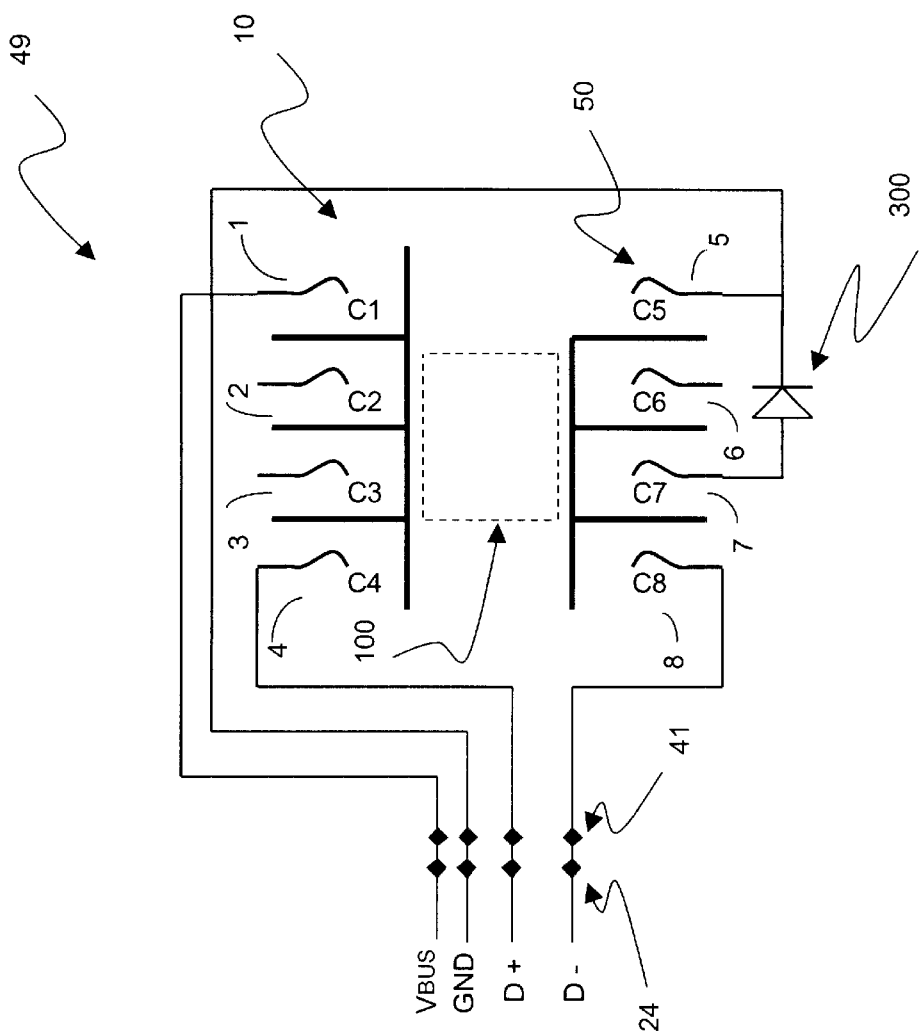
FIG. 8 shows a USB interface connection between a USB smart card module within a token reader and a USB port using a plug connector and driving a LED to indicate USB traffic activity.

Turning now to FIG. 8, FIG. 8 shows a USB interface connection between a USB smart card module 10 within a token reader 500 and a USB port 24 using a plug connector 41 and driving a LED 300 to indicate USB traffic activity, as physically depicted in FIG. 7. Eight pass-through connector pins 50 within the token reader 500 connect to the contacts on the smart card module 10. The electrical connections from the smart card module 10 are connected to a USB Series A plug connector 41. The USB compatible smart card module 10 is inserted in a USB style token reader 500 terminated by the USB series A plug connector 41. The connector 41 may plug directly into a USB port 24 of a Host PC 21 root hub equipped with a series A receptacle or a USB port of a hub equipped with the same receptacle as depicted in FIG. 4. The hub provides the $V_{BUS}$ power supply connected to the contact C1 1 on the smart card module 10, the GND reference voltage connected to the contact C5 5 on the smart card module 10, the Data signal D+ connected to the contact C4 4 on the smart card module 10, and the Data signal D− connected to the contact C8 8 on the smart card module 10. The anode of a LED 300 is connected to the contact C7 of the smart card module 10 and the cathode of the LED is connected to the GND reference voltage of the smart card module 10. A USB style token reader will normally provide these signals to the smart card module according to the electrical and transmission protocols defined in the USB specification. In the present embodiment of the invention the smart card module contacts C2, C3, and C6 are not assigned. While the present embodiment of the invention makes use of contact C4 4 and contact C8 8, the ISO 7816-2 standard reserves these two contacts for future use. The ISO 7816-10 assigns C4 to Function code FCB in synchronous application.

Figure 9:
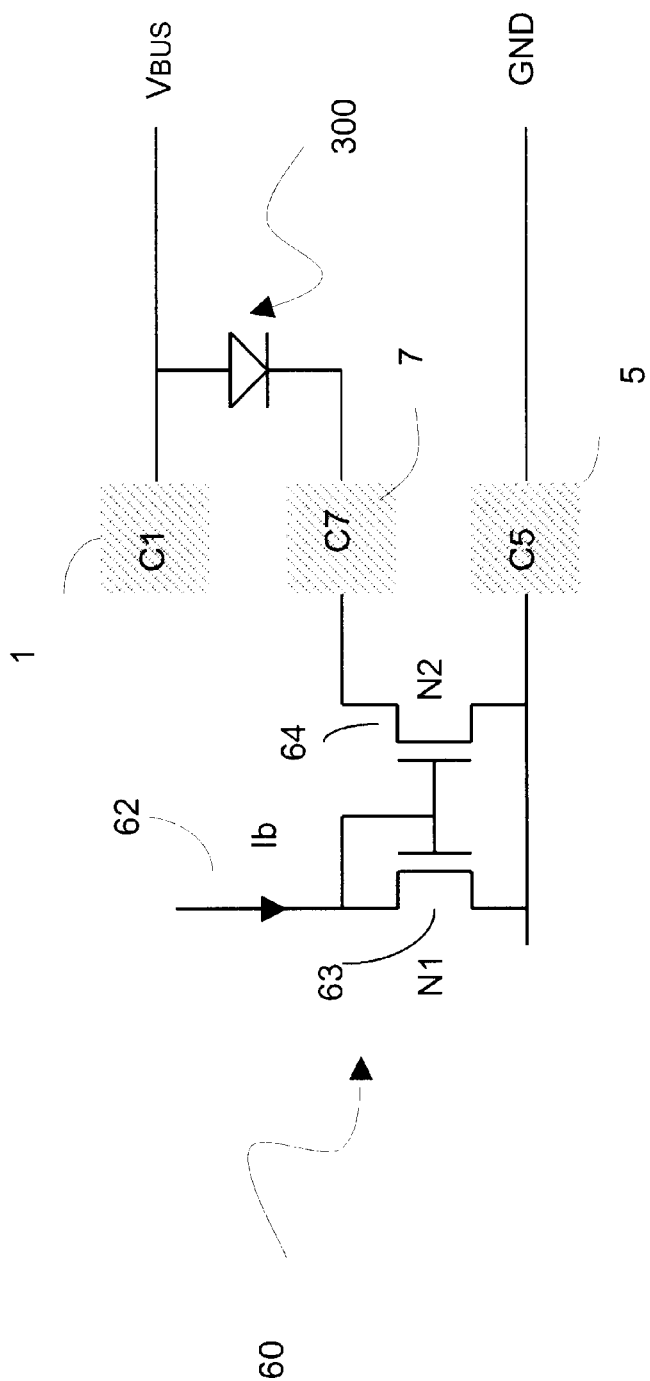
FIG. 9 shows the electrical schematic of the USB traffic signaling LED biased by a current sink to GND reference voltage.

Turning now to FIG. 9, FIG. 9 shows the electrical schematic 60 of the USB traffic signaling LED 300 biased by a current source to contact C5 5. The current source circuit is part of the IC 100 mounted on the smart card module 10. FIG. 9 depicts a current mirror circuit 60 that comprises NMOS transistors 63, 64 that enable the current in the LED 300 to be determined by the current 62 into the NMOS transistor 63, such that the current 62 into the NMOS transistor 63 is proportional to the current through the NMOS transistor 64 that flows through the LED 300. Current mirror circuits and their operation are well known to skilled practitioners of the electronics art. The NMOS transistor 64 is connected between the contact C7 7 and the contact C5 5. The LED 300 is connected between the supply voltage $V_{BUS}$ and the contact C7 7, the anode of the LED 300 being connected to $V_{BUS}$ and the cathode of the LED 300 being connected to the contact C7 7. The current 62, and hence current through the LED 300, determines the brightness of the LED 300, and is a function of the amount of USB traffic.

Figure 10:
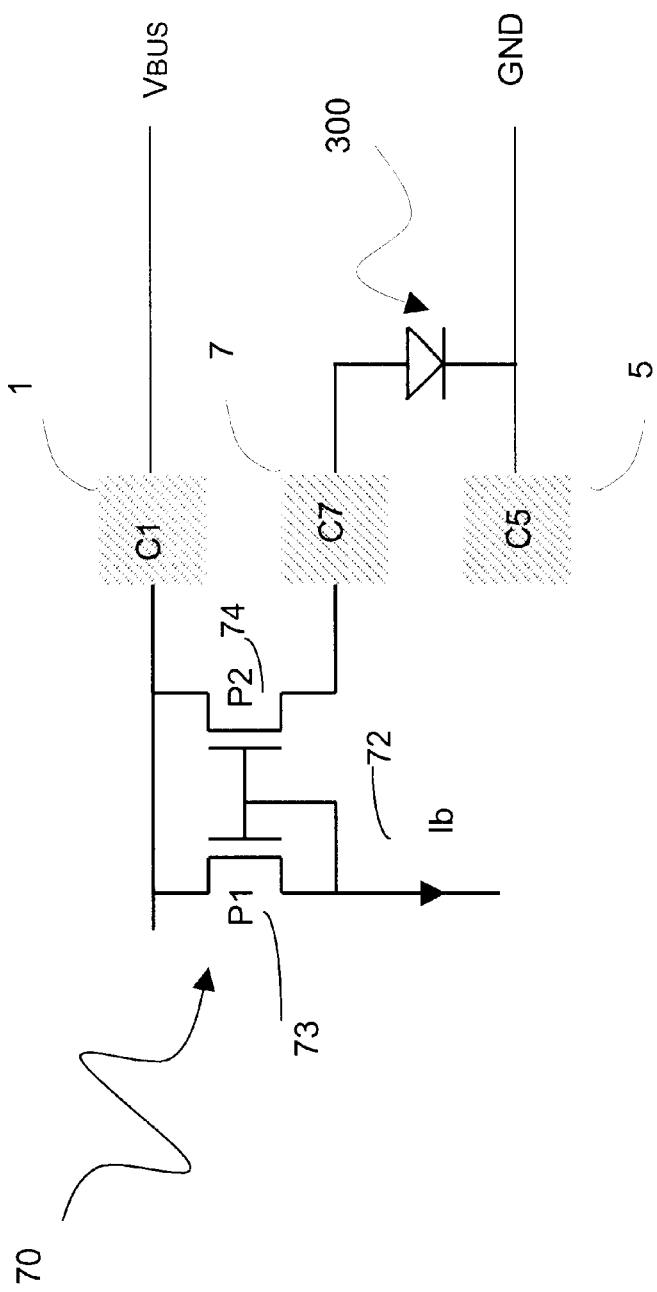
FIG. 10 shows the electrical schematic of the USB traffic signaling LED biased by a current source from $V_{BUS}$.

Turning now to FIG. 10, FIG. 10 shows the electrical schematic 70 of the USB traffic signaling LED 300 biased by a current source from contact C1 1. The current source circuit is part of the IC 100 mounted on the smart card module 10. FIG. 10 depicts a current mirror circuit 70 that comprises PMOS transistors 73, 74 that enable the current in the LED 300 to be determined by the current 72 into the PMOS transistor 73, such that the current 72 into the PMOS transistor 73 is proportional to the current through the PMOS transistor 74 that flows through the LED 300. Current mirror circuits and their operation are well known to skilled practitioners of the electronics art. The PMOS transistor 74 is connected between the I/O contact 7 and the contact C1 1. The LED 300 is connected between the GND reference voltage and the contact C7 7, the anode of the LED 300 being connected to the contact C7 7 and the cathode of the LED 300 being connected to GND reference voltage . The current 72, and hence current through the LED 300, determines the brightness of the LED 300, and is a function of the amount of USB traffic.

Figure 11:
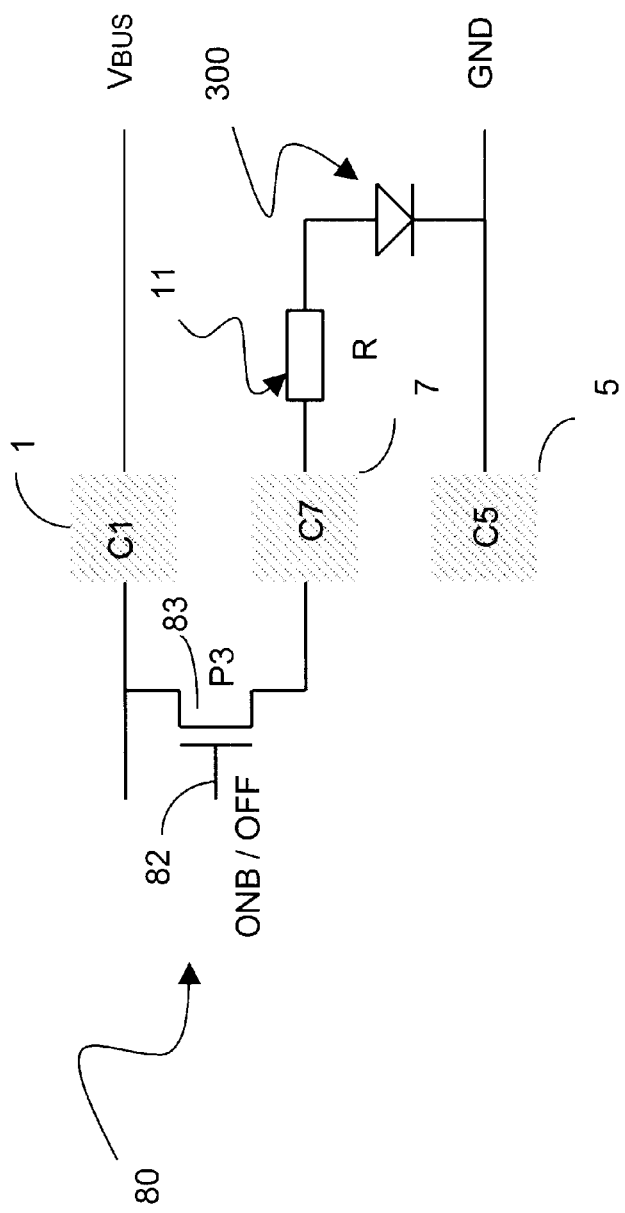
FIG. 11 shows the electrical schematic of the USB traffic signaling LED enabled by a switch to $V_{BUS}$.

Turning now to FIG. 11, FIG. 11 shows the electrical schematic 80 of the USB traffic signaling LED 300 enabled by a current switch from contact C1 1 . The current switch circuit is part of the IC 100 mounted on the smart card module 10. FIG. 11 depicts a voltage switch circuit 80 comprising a PMOS transistor switch 83 connected between the contact C7 7 and the contact C1 1. A series circuit consisting of an LED 300 and a resistor 11 is connected between GND reference voltage and the contact C7 7, the cathode of the LED 300 being connected to GND reference voltage. When a negative voltage is applied to the gate 82 of the PMOS transistor 83, it is switched on, causing current to flow from the contact C7 7 through the resistor 11 and the LED 300 to the GND reference voltage. The resistor 11 limits the current through the LED 300. The modulation of the voltage at the gate 82 of the PMOS transistor 83 is a function of the USB traffic, making the brightness of the LED 300, a function of the amount of USB traffic.

Figure 12:
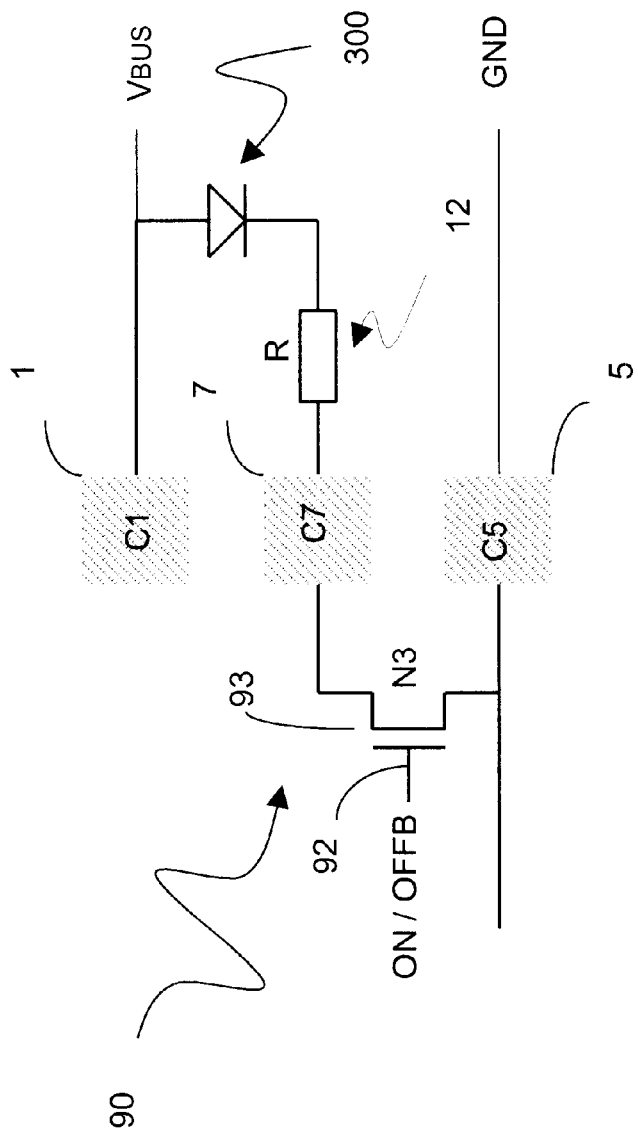
FIG. 12 shows the electrical schematic of the USB traffic signaling LED enabled by a switch to GND reference voltage.

Turning now to FIG. 12, FIG. 12 shows the electrical schematic 90 of the USB traffic signaling LED 300 enabled by a current switch to the contact C5 5. The current switch circuit is part of the IC 100 mounted on the smart card module 10. FIG. 12 depicts a voltage switch circuit 90 comprising an NMOS transistor switch 93 connected between the contact C7 7 and the contact C5 5. A series circuit consisting of an LED 300 and a resistor 12 is connected between the supply voltage $V_{BUS}$ and the contact C7 7, the anode of the LED 300 being connected to $V_{BUS}$. When a positive voltage is applied to the gate 92 of the NMOS transistor 93, it is switched on, causing current to flow through the LED 300 and the resistor 12 to the GND reference voltage. The resistor 12 limits the current through the LED 300. The modulation of the voltage at the gate 92 of the NMOS transistor 93 is a function of the USB traffic, making the brightness of the LED 300, a function of the amount of USB traffic. Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A method for signaling transaction activity between a Universal Serial Bus (USB) smart card module and a USB port, wherein the smart card module has four smart card contacts used to connect the smart card module to the USB and at least one smart card contact not used to connect the smart card module to the USB, and wherein the smart card module is connected to the USB via an interface device having a connector with contacts corresponding to the contacts on the smart card, comprising:
   a) transmitting and receiving USB packets between the smart card module and the USB port;
   b) upon successful transmission and reception of a USB packet, generating on the smart card module on the at least one contact not used for USB traffic a correct transfer signal; and
   c) signaling transaction activity based on the correct transfer signal, on a display located on the interface device and connected to the at least one smart card contact not used to connect the smart card module to the USB.

2. A method according to claim 1, wherein the signaling step comprises:
   a) connecting the correct transfer signal to an input of a counter, wherein both the correct transfer signal and the input of a counter are positioned within the smart card module; and
   b) signaling transaction activity based on an output of the counter.

3. A method according to claim 2, further comprising selecting an output of the counter so that the user is provided with a perceptible indication of signaling transaction activity wherein the perceptible indication is provided on the interface device.

4. A method according to claim 2, further comprising connecting the output of the counter to an output buffer positioned within the smart card module that drives a LED located on the interface device.

5. A method according to claim 4, wherein the output buffer comprises a current source circuit connected to a GND reference voltage.

6. A method according to claim 4, wherein the output buffer comprises a current source circuit connected to a $V_{BUS}$ supply voltage.

7. A method according to claim 4, wherein the output buffer comprises a switch circuit connected to a $V_{BUS}$ supply voltage.

8. A method according to claim 4, wherein the output buffer comprise a switch circuit connected to a GND reference voltage.

9. A method for signaling transaction activity between a Universal Serial Bus (USB) smart card module and a USB port, comprising:
   a) transmitting and receiving USB packets comprising differential serial signals between the USB port and external terminals of transceivers positioned within the smart card module;
   b) connecting internal terminals of the transceivers to inputs of a serial engine positioned within the smart card module;
   c) interconnecting a correct transfer signal from an output of the serial engine to a micro-controller and a counter, both positioned within the smart card module;
   d) controlling the counter from the micro-controller;
   e) driving an input of an output buffer positioned within the smart card module from an output of the counter; and
   f) activating a device from an output of the output buffer for signaling transaction activity based on the correct transfer signal.

10. A method according to claim 9, wherein device being activated is a LED, having an anode and a cathode.

11. A method according to claim 10, further comprising the steps of:
   a) connecting the anode of the LED to a $V_{BUS}$ supply voltage
   b) connecting the cathode of the LED to an I/O contact of the smart card module;
   c) connecting a first NMOS transistor of a current mirror circuit within the smart card module between the I/O contact and a GND reference voltage contact for providing a modulated current sink for illumination of the LED;
   d) connecting a second NMOS transistor of the current mirror circuit within the smart card module to the first NMOS transistor; and
   e) providing a modulated current to the second NMOS transistor from the output of the output buffer that reflects the USB transaction activity, causing the illumination intensity of the LED to be modulated according to the USB transaction activity.

12. A method according to claim 11, wherein the cathode of the LED is connected to a contact of the smart card module selected from the group consisting of C2, C3, C6 and C7.

13. A method according to claim 10, further comprising the steps of:
   a) connecting the anode of the LED to an I/O contact of the smart card module;
   b) connecting the cathode of the LED to a GND reference voltage
   c) connecting a first PMOS transistor of a current mirror circuit within the smart card module between the I/O contact and a $V_{BUS}$ supply voltage contact for providing a modulated current source for illumination of the LED;
   d) connecting a second PMOS transistor of the current mirror circuit within the smart card module to the first PMOS transistor; and
   e) providing a modulated current to the second PMOS transistor from the output of the output buffer that reflects the USB transaction activity, causing the illumination intensity of the LED to be modulated according to the USB transaction activity.

14. A method according to claim 13, wherein the anode of the LED is connected to a contact of the smart card module selected from the group consisting of C2, C3, C6 and C7.

15. A method according to claim 10, further comprising the steps of:
   a) connecting a resistor in series with the LED
   b) connecting a first terminal of the LED in series with the resistor to a GND reference voltage;
   c) connecting a second terminal of the LED in series with the resistor to an I/O contact of the smart card module;
   d) connecting a PMOS transistor switch of a current switch circuit within the smart card module between the I/O contact and $V_{BUS}$ supply voltage contact; and
   e) providing a modulated voltage source from the output of the output buffer that reflects the USB transaction activity to a gate terminal of the PMOS transistor switch within the smart card module, causing the illumination intensity of the LED to be modulated according to the USB transaction activity.

16. A method according to claim 15, wherein the second terminal of the LED in series with the resistor is connected to a contact of the smart card module selected from the group consisting of C2, C3, C6 and C7.

17. A method according to claim 10, further comprising the steps of:
   a) connecting a resistor in series with the LED;
   b) connecting a first terminal of the LED in series with the resistor to a $V_{BUS}$ supply voltage;
   c) connecting a second terminal of the LED in series with the resistor to an I/O contact of the smart card module;
   d) connecting an NMOS transistor switch of a current switch circuit within the smart card module between the I/O contact and a GND reference voltage; and
   e) providing a modulated voltage source from the output of the output buffer that reflects the USB transaction activity to a gate terminal of the NMOS transistor switch within the smart card module, causing the illumination intensity of the LED to be modulated according to the USB transaction activity.

18. A method according to claim 17, wherein the second terminal of the resistor is connected to a contact of the smart card module selected from the group consisting of C2, C3, C6 and C7.

19. A device for signaling transaction activity between a Universal Serial Bus (USB) smart card module and a USB port, comprising:
a) transceivers positioned within the smart card module for transmitting and receiving USB packets comprising differential serial signals between the USB port and external terminals of transceivers;
b) the transceivers having internal terminals connected to inputs of a serial engine positioned within the smart card module;
c) a correct transfer signal from an output of the serial engine interconnected to a micro-controller and a counter, both positioned within the smart card module
d) the counter being controlled from the micro-controller;
e) an output of the counter driving an input of an output buffer positioned within the smart card module; and
f) a device activated from an output of the output buffer for signaling transaction activity based on the correct transfer signal.

20. A device according to claim 19 wherein the device being activated is a LED, having an anode and a cathode.

21. A device according to claim 20, further comprising:
a) the anode of the LED connected to a $V_{BUS}$ supply voltage of the smart card module;
b) the cathode of the LED connected to an I/O contact of the smart card module;
c) a first NMOS transistor of a current mirror circuit within the smart card module connected between the I/O contact and a GND reference voltage contact for providing a modulated current sink for illumination of the LED;
d) a second NMOS transistor of the current mirror circuit within the smart card module connected to the first NMOS transistor; and
b) a modulated current provided to the second NMOS transistor from the output of the output buffer that reflects the USB transaction activity, causing the illumination intensity of the LED to be modulated according to the USB transaction activity.

22. A device according to claim 21, wherein the cathode of the LED is connected to a contact of the smart card module selected from the group consisting of C2, C3, C6 and C7.

23. A device according to claim 20, further comprising:
a) the anode of the LED connected to an I/O contact of the smart card module;
b) the cathode of the LED connected to a GND reference voltage of the smart card module;
c) a first PMOS transistor of a current mirror circuit within the smart card module connected between the I/O contact and a $V_{BUS}$ supply voltage contact for providing a modulated current source for illumination of the LED;
d) a second PMOS transistor of the current mirror circuit within the smart card module connected to the first PMOS transistor; and
e) a modulated current provided to the second PMOS transistor from the output of the output buffer that reflects the USB transaction activity, causing the illumination intensity of the LED to be modulated according to the USB transaction activity.

24. A device according to claim 23, wherein the anode of the LED is connected to a contact of the smart card module selected from the group consisting of C2, C3, C6 and C7.

25. A device according to claim 20, further comprising:
a) a resistor in series with the LED;
b) a first terminal of the LED in series with the resistor connected to a GND reference voltage;
c) a second terminal of the LED in series with the resistor connected to an I/O contact of the smart card module;
d) a PMOS transistor switch of a current switch circuit within the smart card module connected between the I/O contact and a $V_{BUS}$ supply voltage contact; and
e) a modulated voltage source provided from the output of the output buffer that reflects the USB transaction activity to a gate terminal of the PMOS transistor switch within the smart card module, causing the illumination intensity of the LED to be modulated according to the USB transaction activity.

26. A device according to claim 25, wherein the second terminal of the LED in series with the resistor is connected to a contact of the smart card module selected from the group consisting of C2, C3, C6 and C7.

27. A device according to claim 20, further comprising:
a) a resistor in series with the LED;
b) a first terminal of the LED in series with the resistor connected to a $V_{BUS}$ supply voltage;
c) a second terminal of the LED in series with the resistor connected to an I/O contact of the smart card module;
d) an NMOS transistor switch of a current switch circuit within the smart card module connected between the I/O contact and a GND reference voltage; and
e) a modulated voltage source provided from the output of the output buffer that reflects the USB transaction activity to a gate terminal of the NMOS transistor switch within the smart card module, causing the illumination intensity of the LED to be modulated according to the USB transaction activity.

28. A device according to claim 27, wherein the second terminal of the LED in series with the resistor is connected to a contact of the smart card module selected from the group consisting of C2, C3, C6 and C7.

29. A smart card-to-USB interface device, comprising:
a) a connection to a USB;
b) a pass-through connector with a plurality of contact connectors operable to make connections between the USB and a smart card module contacts on a smart card inserted into the smart card-to-USB interface device such that a first contact connector creates a connection between the smart card GND and USB GND, a second contact connector creates a connection between the smart card VCC and USB $V_{BUS}$, a third contact connector for making connections between the smart card D+ and USB D+, and a fourth contact connector for making connections between the smart card D- and the USB D-; and
c) a display having a first terminal connected to a fifth contact connector and a second terminal connected to a contact connector selected from the set including all contact connectors of the pass-through connector;
d) wherein the display indicates a transaction activity between the USB and the smart card module in response to the smart card signaling a correct transfer on the fifth contact connector.

30. The smart card-to-USB interface device of claim 29, wherein the second terminal is connected to the first contact connector.

31. The smart card-to-USB interface device of claim 29, wherein the second terminal is connected to the second contact connector.

32. The smart card-to-USB interface device of claim 29 wherein the second terminal is connected to a sixth contact connector.

33. The smart card-to-USB interface device of claim 29 wherein the display is an LED.

34. A method for signaling transaction activity between a Universal Serial Bus (USB) smart card module and a USB port via an interface device, comprising:
   a) transmitting and receiving USB packets comprising differential serial signals between the USB port and external terminals of transceivers positioned within the smart card module;
   b) connecting internal terminals of the transceivers to inputs of a serial engine positioned within the smart card module;
   c) interconnecting a correct transfer signal from an output of the serial engine to a micro-controller and a counter, both positioned within the smart card module;
   d) controlling the counter from the micro-controller;
   e) driving an input of an output buffer positioned within the smart card module from an output of the counter; and
   c) activating a display device located on the interface device and connected to an output of the output buffer for signaling transaction activity based on the correct transfer signal.

35. A method according to claim 34, wherein display device on the interface device being activated is an LED, having an anode and a cathode.

36. A method according to claim 35, further comprising the steps of:
   a) connecting the anode of the LED to a $V_{BUS}$ supply voltage;
   b) connecting the cathode of the LED to an I/O contact of the smart card module;
   c) connecting a first NMOS transistor of a current mirror circuit within the smart card module between the I/O contact and a GND reference voltage contact for providing a modulated current sink for illumination of the LED;
   d) connecting a second NMOS transistor of the current mirror circuit within the smart card module to the first NMOS transistor; and
   e) providing a modulated current to the second NMOS transistor from the output of the output buffer that reflects the USB transaction activity, causing the illumination intensity of the LED to be modulated according to the USB transaction activity.

37. A method according to claim 36, wherein the cathode of the LED is connected to a contact of the smart card module selected from the group consisting of C2, C3, C6 and C7.

38. A method according to claim 35, further comprising the steps of:
   a) connecting the anode of the LED to an I/O contact of the smart card module;
   b) connecting the cathode of the LED to a GND reference voltage
   c) connecting a first PMOS transistor of a current mirror circuit within the smart card module between the I/O contact and a $V_{BUS}$ supply voltage contact for providing a modulated current source for illumination of the LED;
   d) connecting a second PMOS transistor of the current mirror circuit within the smart card module to the first PMOS transistor; and
   e) providing a modulated current to the second PMOS transistor from the output of the output buffer that reflects the USB transaction activity, causing the illumination intensity of the LED to be modulated according to the USB transaction activity.

39. A method according to claim 38, wherein the anode of the LED is connected to a contact of the smart card module selected from the group consisting of C2, C3, C6 and C7.

40. A method according to claim 35, further comprising the steps of:
   a) connecting a resistor in series with the LED;
   b) correcting a first terminal of the LED in series with the resistor to a GND reference voltage;
   c) connecting a second terminal of the LED in series with the resistor to an I/O contact of the smart card module;
   d) connecting a PMOS transistor switch of a current switch circuit within the smart card module between the I/O contact and $V_{BUS}$ supply voltage contact; and
   d) providing a modulated voltage source from the output of the output buffer that reflects the USB transaction activity to a gate terminal of the PMOS transistor switch within the smart card module, causing the illumination intensity of the LED to be modulated according to the USB transaction activity.

41. A method according to claim 40, wherein the second terminal of the LED in series with the resistor is connected to a contact of the smart card module selected from the group consisting of C2, C3, C6 and C7.

42. A method according to claim 35, further comprising the steps of:
   a) connecting a resistor in series with the LED;
   b) connecting a first terminal of the LED in series with the resistor to a $V_{BUS}$ supply voltage;
   c) connecting a second terminal of the LED in series with the resistor to an I/O contact of the smart card module;
   d) connecting an NMOS transistor switch of a current switch circuit within the smart card module between the I/O contact and a GND reference voltage; and
   e) providing a modulated voltage source from the output of the output buffer that reflects the USB transaction activity to a gate terminal of the NMOS transistor switch within the smart card module, causing the illumination intensity of the LED to be modulated according to the USB transaction activity.

43. A method according to claim 42, wherein the second terminal of the LED in series with the resistor is connected to a contact of the smart card module selected from the group consisting of C2, C3, C6 and C7.

* * * * *